US010013325B1

(12) United States Patent
Garrett, Jr. et al.

(10) Patent No.: US 10,013,325 B1
(45) Date of Patent: Jul. 3, 2018

(54) PROVIDING RESILIENCY TO A RAID GROUP OF STORAGE DEVICES

(71) Applicant: EMC Corporation, Hopkinton, MA (US)

(72) Inventors: Wayne E. Garrett, Jr., Bellingham, MA (US); Ronald D. Proulx, Boxborough, MA (US); Ashok Tamilarasan, Shrewsbury, MA (US); Eric Petsching, Oxford, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 198 days.

(21) Appl. No.: 15/086,632

(22) Filed: Mar. 31, 2016

Related U.S. Application Data

(63) Continuation-in-part of application No. 14/868,577, filed on Sep. 29, 2015.

(51) Int. Cl.
G06F 11/00 (2006.01)
G06F 11/20 (2006.01)
G06F 11/16 (2006.01)

(52) U.S. Cl.
CPC ...... *G06F 11/2094* (2013.01); *G06F 11/1662* (2013.01); *G06F 2201/805* (2013.01)

(58) Field of Classification Search
CPC .................................................. G06F 11/2094
See application file for complete search history.

(56) References Cited

U.S. PATENT DOCUMENTS 8,473,779 B2 * 6/2013 Siewert ............... G06F 11/2094
711/118

* cited by examiner

*Primary Examiner* — Amine Riad
(74) *Attorney, Agent, or Firm* — Jason A. Reyes; Krishnendu Gupta

(57) ABSTRACT

Technique provides resiliency to RAID group including storage devices. Technique involves operating RAID group in normal state in which each storage device is initially online to perform write and read operations and configured to go offline in response to a media error count for that storage device reaching an end-of-life threshold and other storage devices in RAID group being healthy. Technique involves receiving a notification that a storage device of RAID group has encountered an error situation. Technique involves determining whether other storage devices of RAID group are healthy. Technique involves transitioning, in response to receiving notification and determining that other storage devices are healthy, RAID group from normal state to high resiliency degraded state in which the storage device is taken offline and the other storage devices are configured to remain online for facilitating the reconstruction of data associated with the storage device.

20 Claims, 6 Drawing Sheets

PROVIDING RESILIENCY TO A RAID GROUP OF STORAGE DEVICES

RELATED APPLICATION

This application is a continuation-in-part application claiming priority to U.S. patent application Ser. No. 14/868,577, filed Sep. 29, 2015, entitled PROVIDING RESILIENCY TO A RAID GROUP OF STORAGE DEVICES, the entirety of the patent application hereby incorporated by reference herein.

TECHNICAL FIELD

The present invention relates generally to data storage. More specifically, the present invention relates to a computer-implemented method, a computer program product and data storage equipment for providing resiliency to a RAID group of storage devices.

BACKGROUND OF THE INVENTION

A redundant array of independent disks (RAID) group includes multiple disks for storing data. For RAID Level 5, storage processing circuitry stripes data and parity across the disks of the RAID group in a distributed manner.

In one conventional RAID Level 5 implementation, the storage processing circuitry brings offline any failing disks that encounter a predefined number of media errors. Once the storage processing circuitry brings a failing disk offline, the storage processing circuitry is able to reconstruct the data and parity on that disk from the remaining disks (e.g., via logical XOR operations).

Unfortunately, there are deficiencies to the above-described conventional RAID Level 5 implementation in which the storage processing circuitry brings offline any failing disks that encounter a predefined number of media errors. For example, once the failing disk is brought offline, the entire RAID group is now in a vulnerable degraded state which is easily susceptible to unavailability. In particular, if a second disk encounters the predefined number of media errors, the storage processing circuitry will bring the second disk offline thus making the entire RAID group unavailable.

As another example, before a failing disk reaches the predefined number of media errors, suppose that the storage processing circuitry starts a proactive copy process to proactively copy data and parity from the failing disk to a backup disk in an attempt to avoid or minimize data and parity reconstruction. In this situation, the proactive copy process may actually increase the number of media errors encountered by the failing disk due to the additional copy operations caused by the proactive copy process. Accordingly, the proactive copy process may actually promote or cause the storage processing circuitry to bring the failing disk offline sooner.

SUMMARY OF THE INVENTION

There is disclosed a computer-implemented method of providing resiliency to a redundant array of independent disk (RAID) group which includes a plurality of storage devices, the method comprising: operating the RAID group in a normal state in which each storage device is (i) initially online to perform write and read operations and (ii) configured to go offline in response to a media error count for that storage device reaching an end-of-life threshold and other storage devices in the RAID group being healthy; receiving a notification that a storage device of the RAID group has encountered a particular error situation; determining whether other storage devices of the RAID group are healthy; and in response to receiving the notification and determining that the other storage devices of the RAID group are healthy, transitioning the RAID group from the normal state to a high resiliency degraded state in which (i) the storage device is taken offline and (ii) the other storage devices are configured to remain online for facilitating the reconstruction of data associated with the storage device.

There is also disclosed a computer program product having a non-transitory computer readable medium which stores a set of instructions to provide resiliency to a redundant array of independent disk (RAID) group which includes a plurality of storage devices, the set of instructions, when carried out by computerized circuitry, causing the computerized circuitry to perform a method of: operating the RAID group in a normal state in which each storage device is (i) initially online to perform write and read operations and (ii) configured to go offline in response to a media error count for that storage device reaching an end-of-life threshold and other storage devices in the RAID group being healthy; receiving a notification that a storage device of the RAID group has encountered a particular error situation; determining whether other storage devices of the RAID group are healthy; and in response to receiving the notification and determining that the other storage devices of the RAID group are healthy, transitioning the RAID group from the normal state to a high resiliency degraded state in which (i) the storage device is taken offline and (ii) the other storage devices are configured to remain online for facilitating the reconstruction of data associated with the storage device.

There is further disclosed data storage equipment, comprising: a set of host interfaces to interface with a set of host computers; a redundant array of independent disk (RAID) group which includes a plurality of storage devices to store host data on behalf of the set of host computers; and control circuitry coupled to the set of host interfaces and the RAID group, the control circuitry being constructed and arranged to: operate the RAID group in a normal state in which each storage device is (i) initially online to perform write and read operations and (ii) configured to go offline in response to a media error count for that storage device reaching an end-of-life threshold and other storage devices in the RAID group being healthy; receive a notification that a storage device of the RAID group has encountered a particular error situation; determine whether other storage devices of the RAID group are healthy; and in response to receiving the notification and determining that the other storage devices of the RAID group are healthy, transition the RAID group from the normal state to a high resiliency degraded state in which (i) the storage device is taken offline and (ii) the other storage devices are configured to remain online for facilitating the reconstruction of data associated with the storage device.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Figure 1:
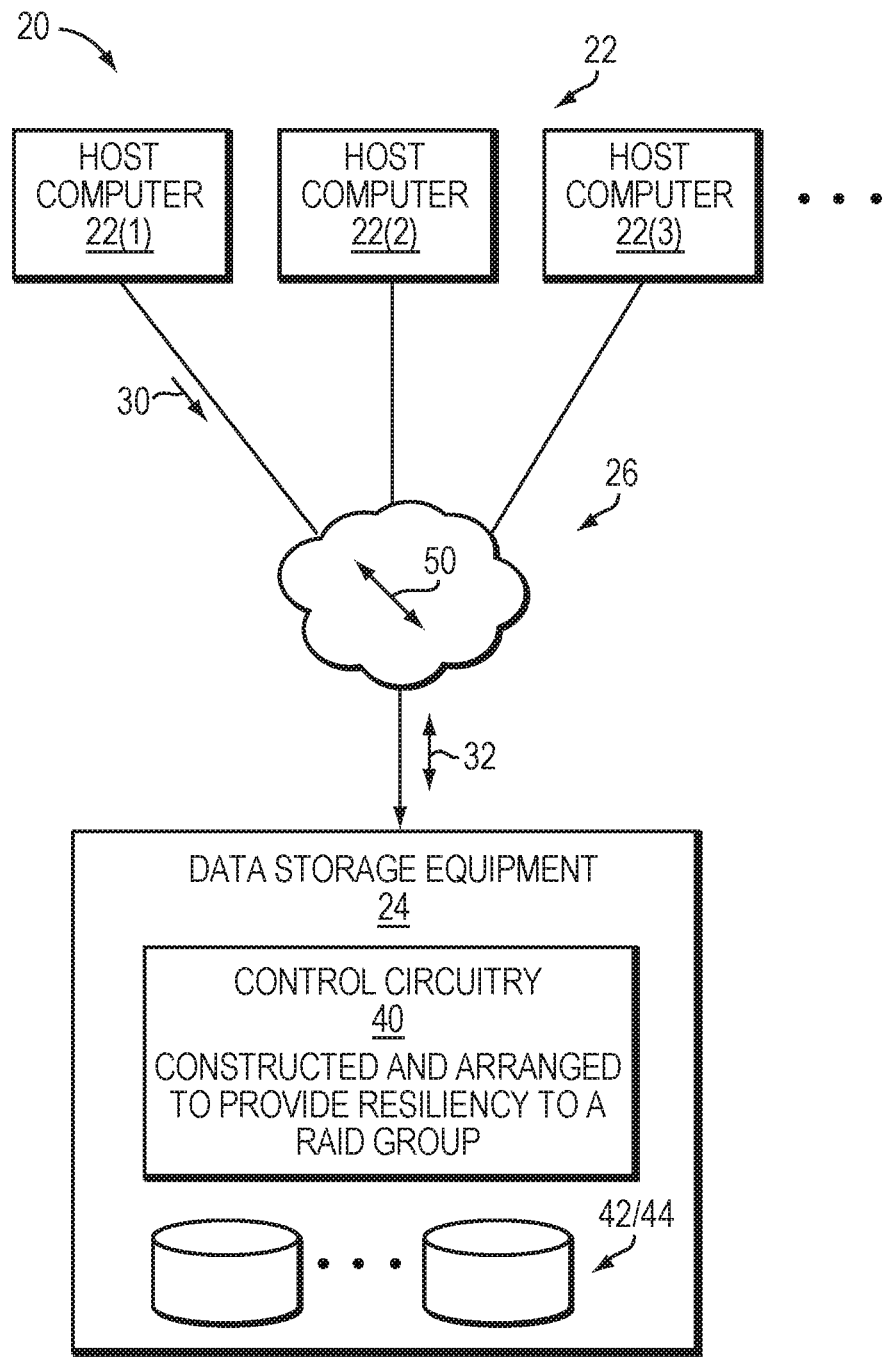
FIG. 1 is a block diagram of a data storage environment which provides resiliency to a RAID group.

FIG. 1 is a block diagram of a data storage environment 20 which provides resiliency to a RAID group. The data storage environment 20 includes host computers 22(1), 22(2), 22(3), . . . (collectively, host computers 22), data storage equipment 24, and a communications medium 26.

Each host computer 22 is constructed and arranged to perform useful work. For example, a host computer 22 may operate as a web server, a file server, an email server, an enterprise server, and so on, which provides I/O requests 30 (e.g., small computer system interface or SCSI commands) to the data storage equipment 24 to store host data 32 in and read host data 32 from the data storage equipment 24.

The data storage equipment 24 includes control circuitry 40 and a RAID group 42 having storage devices 44 (e.g., solid state drives, magnetic disk drivers, etc.). The control circuitry 40 may be formed by one or more physical storage processors, data movers, director boards, blades, I/O modules, storage drive controllers, switches, combinations thereof, and so on. The control circuitry 40 is constructed and arranged to process the I/O requests 30 from the host computers 22 by robustly and reliably storing host data 32 in the RAID group 42 and retrieving the host data 32 from the RAID group 42. Additionally, in at least one of the embodiments described herein, and as will be explained in further detail shortly, the control circuitry 40 provides resiliency to the RAID group 42 by raising and/or disabling certain thresholds in response to an error situation. Accordingly, the host data 32 remains available to the host computers 22 with higher tolerance to further errors even following the initial error situation.

The communications medium 26 is constructed and arranged to connect the various components of the data storage environment 20 together to enable these components to exchange electronic signals 50 (e.g., see the double arrow 50). At least a portion of the communications medium 26 is illustrated as a cloud to indicate that the communications medium 26 is capable of having a variety of different topologies including backbone, hub-and-spoke, loop, irregular, combinations thereof, and so on. Along these lines, the communications medium 26 may include copper-based data communications devices and cabling, fiber optic devices and cabling, wireless devices, combinations thereof, etc. Furthermore, the communications medium 26 is capable of supporting LAN-based communications, SAN-based communications, cellular communications, combinations thereof, etc.

During operation, the control circuitry 40 of the data storage equipment 24 processes the I/O requests 30 from the host computers 22. In particular, the control circuitry 40 stores host data 32 in the RAID group 42 and loads host data from the RAID group 42 on behalf of the host computers 22.

At some point, the control circuitry 40 may detect that a particular storage device 44 of the RAID group 42 has encountered a particular error situation. For example, the number of media errors for the particular storage device 44 may have exceeded an initial take-offline threshold causing that storage device 44 to go offline. As another example, the number of media errors for the particular storage device 44 may have reached a proactive copy threshold causing the control circuitry 40 begin a proactive copy process which copies data and parity from the particular storage device 44 to a spare storage device 44 in an attempt to avoid having to reconstruct the data and parity on the particular storage device 44. As a further example, the number of media errors for the particular storage device 44 may have just reached a proactive copy threshold causing the control circuitry 40 to check the health of other storage devices 44 from the RAID group 42 in an attempt to decide whether to perform a proactive copy operation or to fail the particular storage device 44 and reconstruct the data and parity on the particular storage device 44 from the other storage devices 44.

In response to such an error situation, the control circuitry 40 adjusts the failure tolerance of the data storage equipment 24 so that the operable storage devices 44 stay online even if an operating storage device 44 reaches the initial take-offline threshold. In particular, the control circuitry 40 raises or disables the initial take-offline threshold for the storage devices 44 so that the operable storage devices 44 of the RAID group 42 remain online and continue to operate even if the number of media errors for another storage device 44 exceeds the initial take-offline threshold. Accordingly, although response times may be slower than normal, the host computers 22 are able to continue accessing host data 32 in the RAID group 42. Further details will now be provided with reference to FIG. 2.

Figure 2:
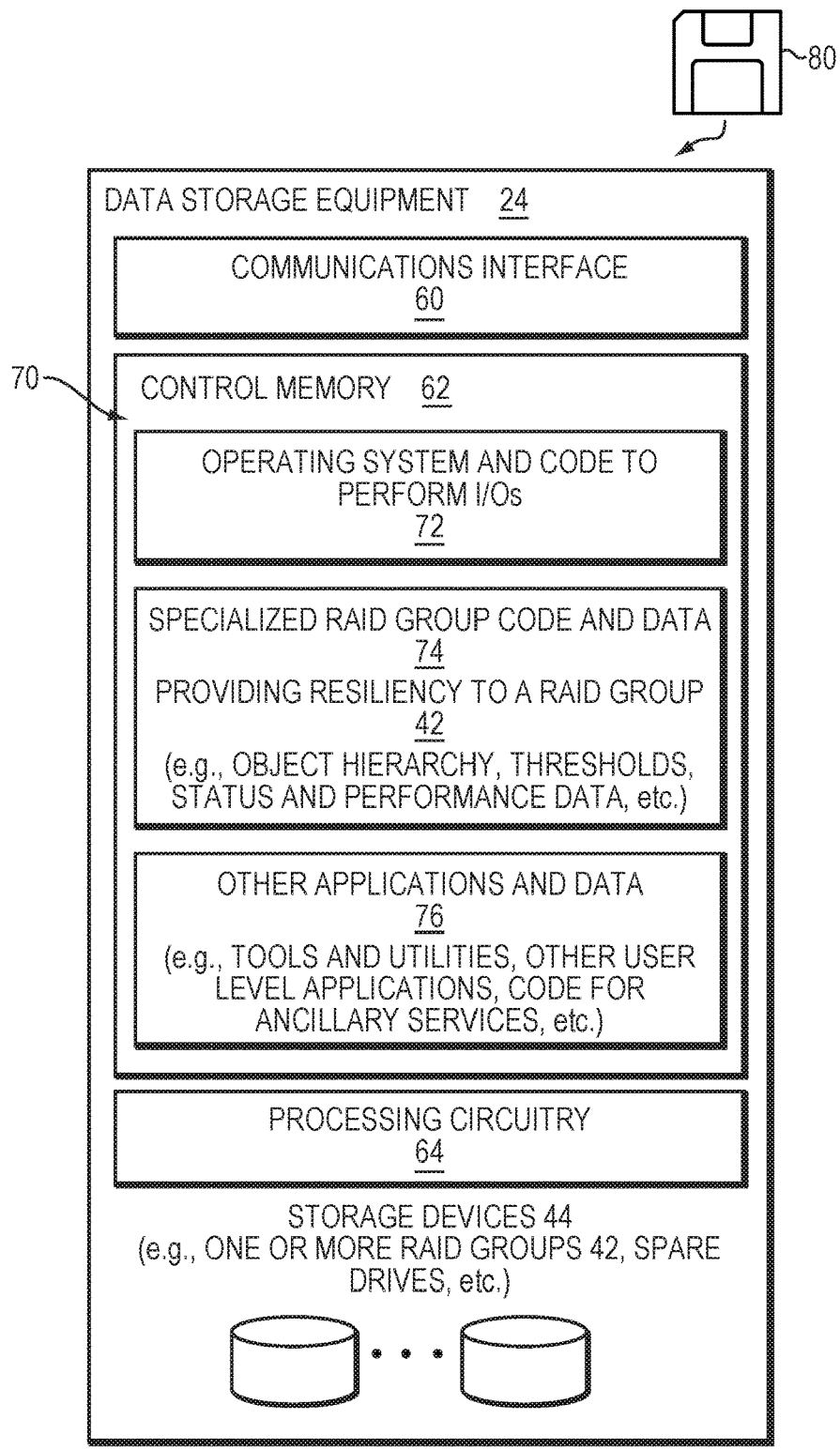
FIG. 2 is a block diagram of particular data storage equipment of the data storage environment of FIG. 1.

FIG. 2 shows particular details of the data storage equipment 24 (also see FIG. 1). The data storage equipment 24 includes a communications interface 60, control memory 62, and processing circuitry 64, and a set of storage devices 44.

The communications interface 60 is constructed and arranged to connect the data storage equipment 24 to the communications medium 26 (also see FIG. 1) to enable communications with other apparatus of the data storage environment 20 (e.g., the host computers 22). Such communications may be IP-based, SAN-based, cellular-based, cable-based, fiber-optic based, wireless, combinations thereof, and so on. Accordingly, the communications interface 60 enables the data storage equipment 24 to robustly and reliably communicate with other external equipment.

The control memory 62 is intended to represent both volatile storage (e.g., DRAM, SRAM, etc.) and non-volatile storage (e.g., flash memory, magnetic memory, etc.). The control memory 62 stores a variety of software constructs 70 including an operating system and code to perform host I/O operations 72, specialized RAID Group code and data 74, and other applications and data 76. The operating system and code to perform host I/O operations 72 is intended to refer to code such as a kernel to manage computerized resources (e.g., processor cycles, memory space, etc.), drivers (e.g., an I/O stack), core data moving code, and so on. The specialized RAID group code and data 74 includes instructions and information to provide resiliency to one or more RAID groups to improve RAID group availability. The other applications and data 76 include administrative tools, utilities, other user-level applications, code for ancillary services, and so on.

The processing circuitry 64 is constructed and arranged to operate in accordance with the various software constructs 70 stored in the control memory 62. In particular, the processing circuitry 64 executes portions of the various software constructs 70 to form the control circuitry 40 (also see FIG. 1). Such processing circuitry 64 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 80 is capable of delivering all or portions of the software constructs 70 to the data storage equipment 24. Along these lines, the computer program product 80 has a non-transitory (or non-volatile) computer readable medium which stores a set of instructions which controls one or more operations of the data storage equipment 24. Examples of suitable computer readable storage media include tangible articles of manufacture and apparatus which store instructions in a non-volatile manner such as CD-ROM, flash memory, disk memory, tape memory, and the like.

The storage devices 44 refer to solid state drives (SSDs), magnetic disk drives, combinations thereof, etc. The storage devices 44 may form one or more RAID groups 42 for holding information such as the host data 32, as well as spare drives (e.g., storage devices on hot standby). In some arrangements, some of the control memory 62 is formed by a portion of the storage devices 44. It should be understood that a variety of RAID Levels are suitable for use, e.g., RAID Level 4, RAID Level 5, RAID Level 6, and so on.

During operation, the processing circuitry 64 executes the specialized RAID group code and data 74 to form the control circuitry 40 (FIG. 1) which provides resiliency to a RAID group 42. Along these lines, such execution forms a hierarchy of object instances (or simply objects) representing various parts of the RAID group 42 (e.g., a RAID group object to represent the RAID group 42 itself, individual storage device objects to represent the storage devices 44 of the RAID group 42, etc.).

It should be understood that each object of the object hierarchy is able to monitor events and exchange messages with other objects (e.g., commands and status). Along these lines, when a storage device 44 encounters a media error, the storage device object that represents that storage device 44 increments a media error tally for that storage device. If the storage device object then determines that the storage device 44 encountered a particular situation due to incrementing the media error tally, the storage device object may perform a particular operation.

For example, the storage device object may determine that the number of media errors for a failing storage device 44 has surpassed an initial take-offline threshold. In such a situation, the storage device object may take the failing storage device 44 offline. In response, the RAID group object that represents the RAID group 42 which includes the failing storage device 44 will detect the loss of that storage device 44 and thus transition from a normal state to a degraded state. Also, as will be explained in further detail shortly, the RAID group object may send commands to the remaining storage device objects that either raise or disable the initial take-offline threshold to prevent another storage device object from taking its storage device 44 offline. Accordingly, the RAID group 42 is now more resilient.

As another example, the storage device object may determine that the number of media errors for a failing storage device 44 reaches a proactive copy threshold. In such a situation, the storage device object may invoke a proactive copy process to proactively copy data and parity from the failing storage device 44 (i.e., the source) to a spare storage device 44 (i.e., the destination). Such a process attempts to eventually replace the failing storage device 44 with spare storage device 44 and thus avoid having to reconstruct all of the data and parity on the failing storage device 44. In the proactive copy situation and as will be explained in further detail shortly, the proactive copy process may add further media errors. Accordingly, the RAID group object may send commands to the storage device objects that either raise or disable the initial take-offline threshold to prevent the storage device object from taking its storage device 44 offline. As a result, the RAID group 42 is now more resilient to failure.

As a further example, the storage device object may notify the RAID group object upon determining that the number of media errors for a failing storage device 44 reaches a proactive copy threshold. In such a situation, the RAID group object may send commands to storage device objects associated with other storage devices of the RAID group checking the health of the other storage devices 44 in an attempt to decide whether to perform a proactive copy operation or to fail the failing storage device 44. In at least one arrangement, if the RAID group object determines that all the other storage devices are healthy, the RAID group object will take the failing storage device 44 offline to enable the data and parity to be reconstructed from the other storage devices 44. The RAID group object may also send commands to the other storage device objects that either raise or disable the initial take-offline threshold to prevent the other storage device object from taking its storage device 44 offline. Further details will now be provided with reference to FIG. 3.

Figure 3:
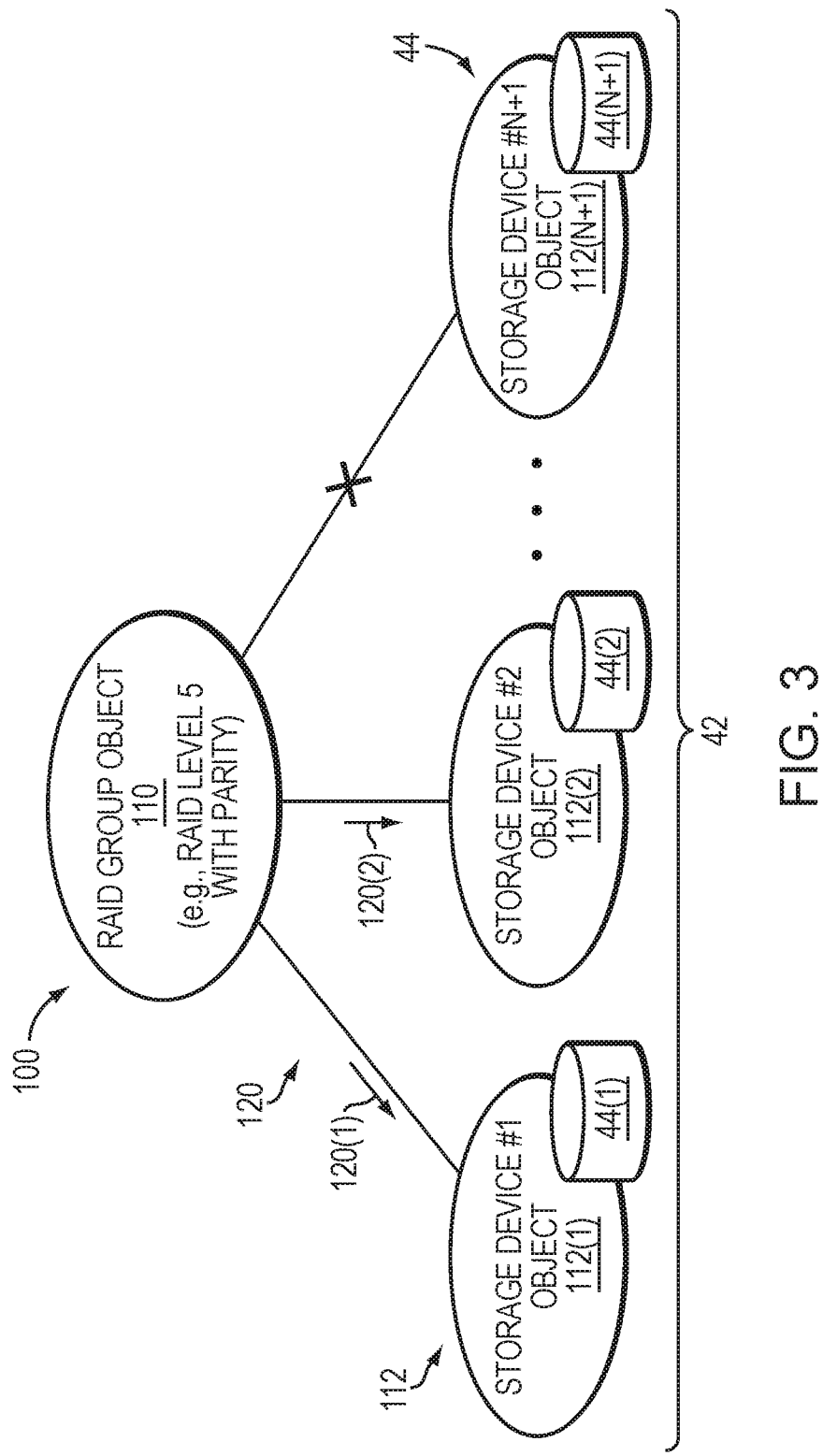
FIG. 3 is a block diagram illustrating particular details of a first error situation.

FIG. 3 is a block diagram illustrating particular details of how the data storage equipment 24 handles a first error situation. As shown in FIG. 3, the data storage equipment 24 manages a RAID group 42 using an object hierarchy 100. The object hierarchy 100 includes a RAID group object 110, and storage device objects 112(1), 112(2), . . . , 112(N+1) (collectively, storage device objects 112). It should be understood that the term N+1 is used by way of example since, in this example, there are N data portions and 1 parity portion (hence N+1) for each stripe across the RAID group 42.

One should appreciate that the object hierarchy 100 has the form of an inverted tree of objects or nodes. In particular, the storage device objects 112 appear to be leafs or children of the RAID group object 110. Additionally, the RAID group object 110 appears as a root or parent of the storage device objects 112.

The RAID group object 110 is constructed and arranged to represent the RAID group 42 (also see FIG. 1). In particular, the RAID group object 110 monitors and handles events at the RAID level. To this end, the RAID group object 110 communicates with the storage device objects 112 and stores particular types of information such as a RAID group state (e.g., "normal", "degraded", "broken", etc.). Additionally, the RAID group object 110 issues commands and queries to other objects of the object hierarchy 100 such as the storage device objects 112. It should be understood that it is actually the processing circuitry 64 executing code of the RAID group object 110 that is performing such operations (also see FIG. 2).

Similarly, the storage device objects 112 are constructed and arranged to represent the storage devices 44 of the RAID group 42 (also see FIG. 1). In particular, each storage device object 112 (i.e., the processing circuitry 64 executing code of the storage device object 112) monitors and handles events for a particular storage device 44. To this end, each storage device object 112 maintains a current count of media errors for the particular storage device 44 and compares that count to various thresholds to determine whether any action should be taken. Along these lines, the storage device object 112(1) monitors and handles events for a storage device 44(1), the storage device object 112(2) monitors and handles events for a storage device 44(2), and so on.

Initially, suppose that all of the storage devices 44 of the RAID group 42 are fully operational and in good health. Accordingly, the RAID group object 110 starts in a normal state. During this time, each storage device object 112 maintains a current media error count for its respective storage device 44. If a storage device object 112 detects that its storage device 44 has encountered a new media error, the storage device object increments its current media error count and compares that count to the initial media error threshold. If the count does not exceed the initial media error threshold, the storage device object 112 keeps the storage device 44 online. However, if the count exceeds the initial media error threshold, the storage device object 112 brings the storage device 44 offline.

Now, suppose that the storage device object 112(N+1) detects a media error for its storage device 44(N+1) and that, upon incrementing the current media error count for the storage device 44(N+1), the storage device object 112(N+1) determines that the count surpasses the initial media error threshold. In response to this error situation, the storage device object 112(N+1) takes the storage device 44(N+1) offline (illustrated by the "X" in FIG. 3).

At this point, the RAID group object 110 detects that the storage device 44(N+1) has gone offline, and sends don't-take-offline (DTO) commands 120(1), 120(2), . . . to the storage device objects 112(1), 112(2), . . . that represent the storage devices 44(1), 44(2), . . . that are still online. In some arrangements, these DTO commands 120 direct the storage device objects 112 to raise the initial media error threshold to a higher media error threshold so that the remaining storage devices 44 are more resilient to media errors (i.e., the remaining storage devices 44 are able to endure a larger number of media errors than the storage device 44(N+1) that went offline). In other arrangements, these DTO commands 120 direct the storage device objects 112 to no longer take their respective storage devices 44 offline in response to media errors. Accordingly, the RAID group 42 is now more resilient to media errors. Such operation is well suited for situations where it is better for the RAID group 42 to remain available even if I/O response time is slower. Further details will now be provided with reference to FIG. 4

Figure 4:
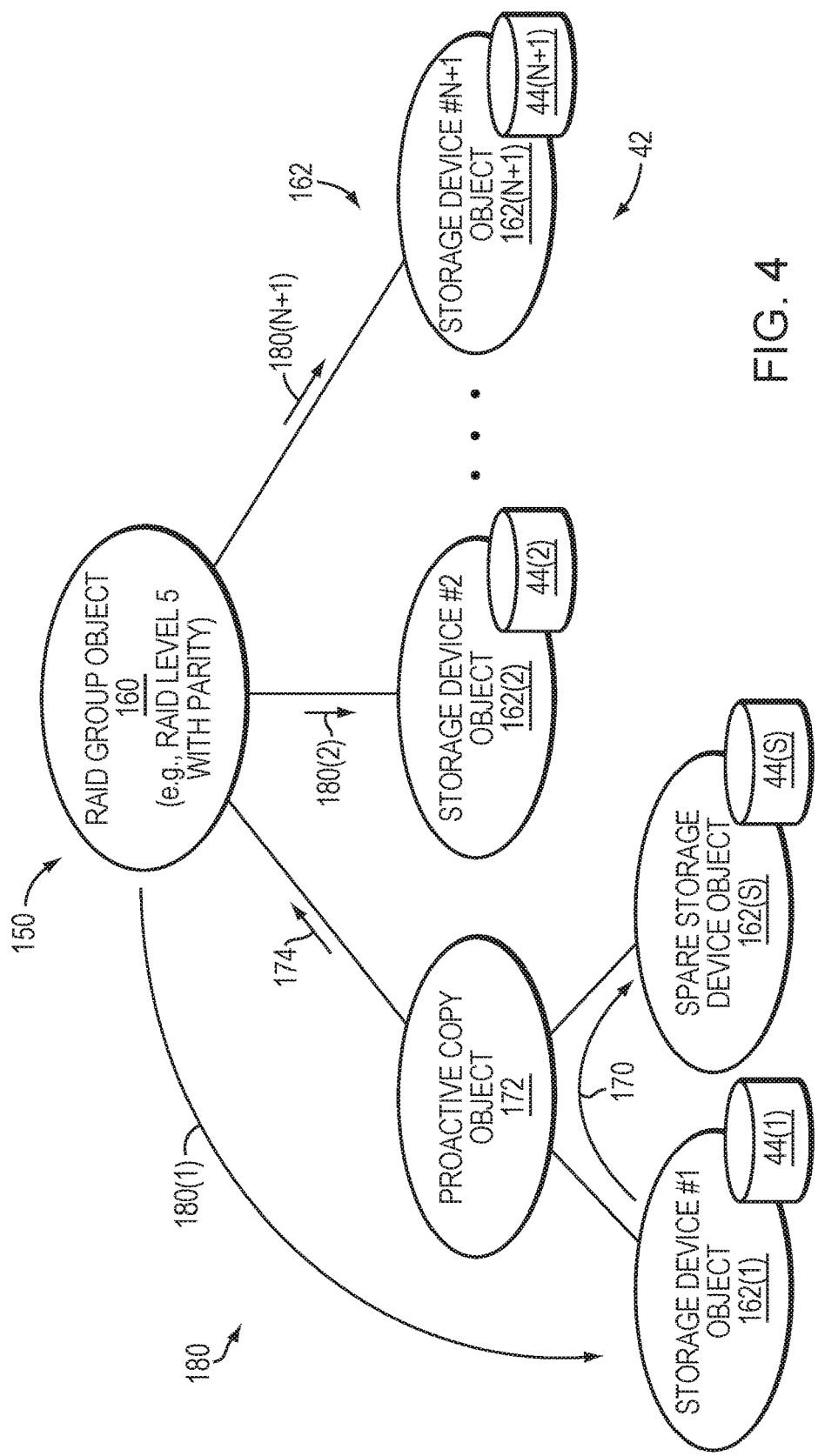
FIG. 4 is a block diagram illustrating particular details of a second error situation.

FIG. 4 is a block diagram illustrating particular details of how the data storage equipment 24 handles a second error situation. The data storage equipment 24 manages a RAID group 42 of storage devices 44(1), . . . , 44(N+1) using an object hierarchy 150. The object hierarchy 150 includes a RAID group object 160, and storage device objects 162(1), 162(2), . . . , 162(N+1) (collectively, storage device objects 162).

As with the situation in FIG. 3, it should be understood that the term N+1 in FIG. 4 is used since there are N data portions and 1 parity portion (hence N+1) for each stripe across the RAID group 42. Furthermore, one should appreciate that the object hierarchy 150 has the form of an inverted tree of objects or nodes where the storage device objects 162 appear to be leafs or children of the RAID group object 160, and the RAID group object 160 appears as a root or parent of the storage device objects 162.

The RAID group object 160 is constructed and arranged to represent the RAID group 42 (also see FIG. 1). Accordingly, the RAID group object 160 monitors and handles events at the RAID level. To this end, the RAID group object 160 communicates with the storage device objects 162 and stores particular types of information such as a RAID group state (e.g., "normal", "degraded", "broken", etc.). Additionally, the RAID group object 160 issues commands and queries to other objects of the object hierarchy 150 such as the storage device objects 162. It should be understood that it is actually the processing circuitry 64 executing code of the RAID group object 160 that is performing these operations (also see FIG. 2).

Similarly, the storage device objects 162 are constructed and arranged to represent the storage devices 44 of the RAID group 42 (also see FIG. 1). In particular, each storage device object 162 (i.e., the processing circuitry 64 executing code of the storage device object 162) monitors and handles events for a particular storage device 44. To this end, each storage device object 162 maintains a current count of media errors for the particular storage device 44 and compares that count to various thresholds to determine whether any action should be taken. That is, the storage device object 162(1) monitors and handles events for a storage device 44(1), the storage device object 162(2) monitors and handles events for a storage device 44(2), and so on.

Initially, suppose that all of the storage devices 44 of the RAID group 42 are fully operational and in good health. Accordingly, the RAID group object 160 starts in a normal state. During this time, each storage device object 162 maintains a current media error count for its respective storage device 44. If a storage device object 162 detects that its storage device 44 has encountered a new media error, the storage device object increments its current media error count and compares that count to a proactive copy threshold (i.e., an end-of-life threshold). If the count does not exceed the proactive copy threshold, the storage device object 162 maintains normal operation of the storage device 44. However, if the count exceeds the proactive copy threshold, the storage device object 162 starts a proactive copy process to copy information (e.g., data and/or parity) from the storage device 44 to a spare storage device 44.

Now, suppose that the storage device object 162(1) detects a media error for its storage device 44(1) and that, upon incrementing the current media error count for the storage device 44(1), the storage device object 162(1) determines that the count surpasses the proactive copy threshold. i.e., the storage device object 162(1) concludes that the storage device 44(1) is failing. In response to this error situation, the storage device object 162(1) begins a series of copy operations 170 to copy information from the failing storage device 44(1) to a spare storage device 44(S) (e.g., an extra storage device 44 that is on hot standby).

To this end, the control circuitry 40 (FIG. 1) instantiates a proactive copy object 172 in response to detection of the error situation by the storage device object 162(1). As illustrated in FIG. 4, the proactive copy object 172 is integrated into the object hierarchy as a parent node of the storage device object 162(1) and a child node of the RAID group object 160. The proactive copy object 172 then sends a proactive copy notification 174 to the RAID group object 160 informing the RAID group object 160 that a proactive copy operation is underway. In response to the proactive copy notification 174 from the proactive copy object 172, the RAID group object sends don't-take-offline (DTO) commands 180(1), 180(2), . . . to the storage device objects 162(1), 162(2), . . . that represent storage devices 44(1), 44(2), . . . . In some arrangements, these DTO commands 180 direct the storage device objects 162 to raise the initial media error threshold to a higher media error threshold so that the proactive copy process does not accelerate bringing the failing storage device 44(1) offline (e.g., the failing storage device 44(1) is able to endure a larger number of media errors than initially). In other arrangements, these DTO commands 180 direct the storage device objects 162 to no longer take their respective storage devices 44 offline in response to media errors. Accordingly, the storage devices 44 are more resilient so there is less likelihood of one of the other storage devices 44 going offline during the proactive copy process. As a result, the RAID group 42 is now more resilient to media errors, i.e., the DTO commands 180 prevent the proactive copy process from promoting or causing the failing storage device 44(1) from going offline sooner.

Upon completion of the proactive copy process, the spare storage device 44(S) can be put in the RAID group 42 in place of the failing storage device 44(1). Any information associated with media errors on the failing storage device 44(1) can be recreated from the remaining storage devices 44(2), . . . , 44(N+1). Accordingly, the entire storage device 44(1) does not need to be reconstructed.

The above approach as described with respect to FIG. 4 has several advantages. However, the approach suffers in that it does not take into consideration host IO latency. It should be understood that if the failing storage device 44(1) is experiencing excessive media errors the error recovery can take a very long time. That is, if the proactive copy operation is initiated, and the situation with respect to the failing storage device 44(1) is severe enough, the host IO can backup due to error recovery. For example, a media error can take several seconds to be returned from the storage device, which may then backup remaining IOs on the storage device itself, resulting eventually in timeouts. There is, therefore, a need for further approaches to deal with host IO latency and timeouts.

With this in mind, the above approach as described with respect to FIG. 4 may be adapted in at least one embodiment to allow the failing storage device 44(1) to fail (rather than perform a proactive copy) such that reconstruction can be performed using the remaining storage devices 44 of the RAID group 42. However, before allowing the failing storage device 44(1) to fail, it will be necessary to determine the health of the remaining storage devices 44 of the RAID group 42 in order to verify that all remaining storage devices 44 are reliable. For example, the reliability of the remaining storage devices 44 can be determined by either a configuration file (e.g., where a person or persons has determined certain types of storage devices to have media issues) or the storage devices themselves have already reported media errors. The new approach will only fail the failing storage device 44(1) upon verifying the reliability or health of the remaining storage devices 44. This will be described further below in connection with FIG. 5.

Figure 5:
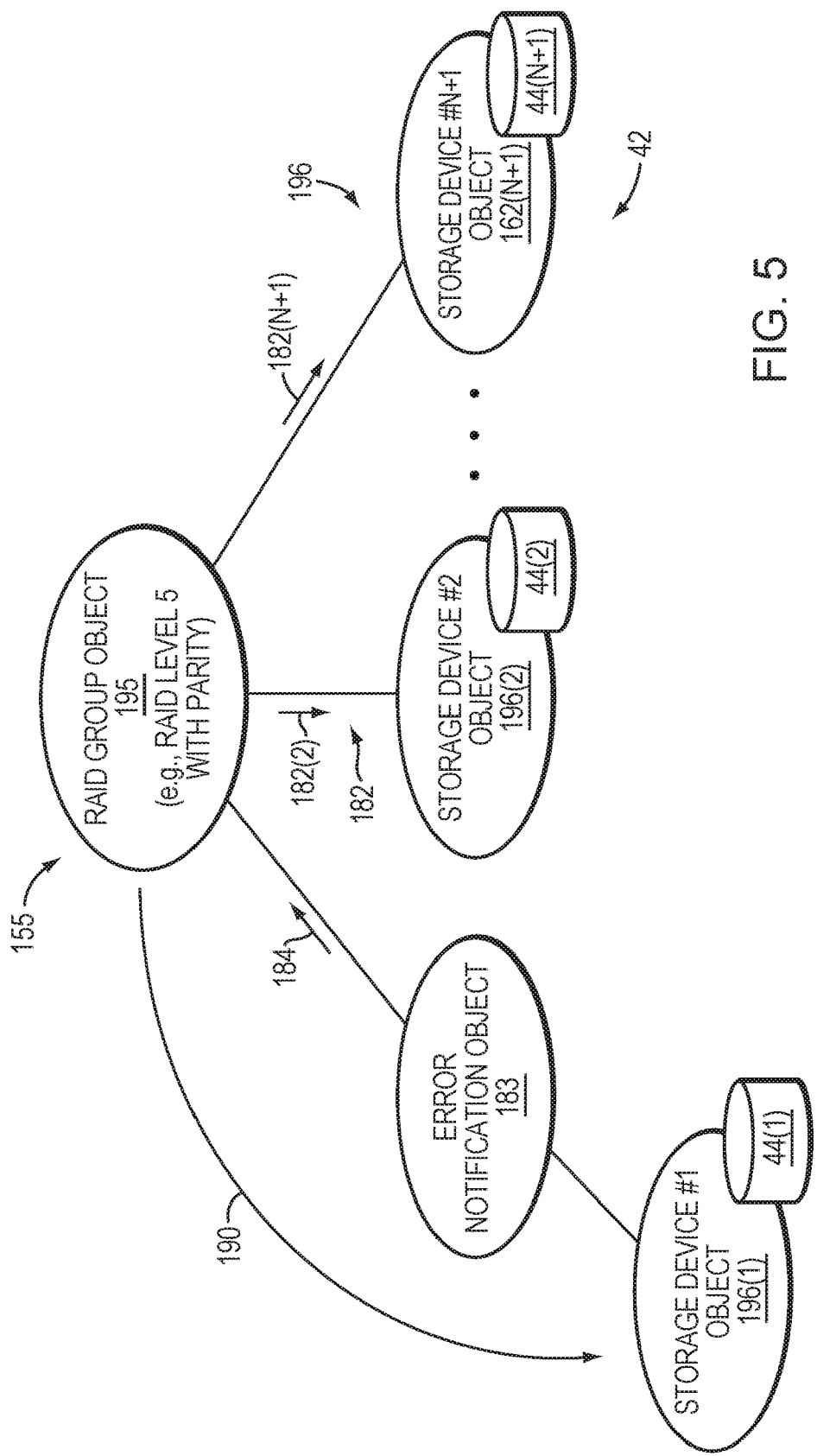
FIG. 5 is a block diagram illustrating particular details of a third error situation.

FIG. 5 is a block diagram illustrating particular details of how the data storage equipment 24 handles a third error situation. The data storage equipment 24 manages a RAID group 42 of storage devices 44(1), . . . , 44(N+1) using an object hierarchy 155. The object hierarchy 155 includes a RAID group object 195, and storage device objects 196(1), 196(2), . . . , 196(N+1) (collectively, storage device objects 196).

As with the situation in FIGS. 3 and 4, it should be understood that the term N+1 in FIG. 5 is used since there are N data portions and 1 parity portion (hence N+1) for each stripe across the RAID group 42. Furthermore, one should appreciate that the object hierarchy 155 has the form of an inverted tree of objects or nodes where the storage device objects 196 appear to be leafs or children of the RAID group object 195, and the RAID group object 195 appears as a root or parent of the storage device objects 196.

The RAID group object 195 is constructed and arranged to represent the RAID group 42 (also see FIG. 1). Accordingly, the RAID group object 195 monitors and handles events at the RAID level. To this end, the RAID group object 195 communicates with the storage device objects 196 and stores particular types of information such as a RAID group state (e.g., "normal", "degraded", "broken", etc.). Additionally, the RAID group object 195 issues commands and queries to other objects of the object hierarchy 155 such as the storage device objects 196. It should be understood that it is actually the processing circuitry 64 executing code of the RAID group object 195 that is performing these operations (also see FIG. 2).

Similarly, the storage device objects 196 are constructed and arranged to represent the storage devices 44 of the RAID group 42 (also see FIG. 1). In particular, each storage device object 196 (i.e., the processing circuitry 64 executing code of the storage device object 196) monitors and handles events for a particular storage device 44. To this end, each storage device object 196 maintains a current count of media errors for the particular storage device 44 and compares that count to various thresholds to determine whether any action should be taken. That is, the storage device object 196(1) monitors and handles events for a storage device 44(1), the storage device object 196(2) monitors and handles events for a storage device 44(2), and so on.

Initially, suppose that all of the storage devices 44 of the RAID group 42 are fully operational and in good health. Accordingly, the RAID group object 195 starts in a normal state. During this time, each storage device object 196 maintains a current media error count for its respective storage device 44. If a storage device object 196 detects that its storage device 44 has encountered a new media error, the storage device object increments its current media error count and compares that count to a proactive copy threshold. If the count does not exceed the proactive copy threshold, the storage device object 196 maintains normal operation of the storage device 44. However, if the count exceeds the proactive copy threshold, the storage device object 196 reports this event to the RAID group object 195.

Now, suppose that the storage device object 196(1) detects a media error for its storage device 44(1) and that, upon incrementing the current media error count for the storage device 44(1), the storage device object 196(1) determines that the count surpasses the proactive copy threshold, i.e., the storage device object 196(1) concludes that the storage device 44(1) is failing. In response to this error situation, the storage device object 196(1) reports this event to the RAID group object 195. It should be understood that in this embodiment the control circuitry 40 (FIG. 1) instantiates an error notification object 183 in response to detection of the error situation by the storage device object 196(1). As illustrated in FIG. 5, the error notification object 183 is integrated into the object hierarchy as a parent node of the storage device object 196(1) and a child node of the RAID group object 195. The error notification object 183 sends an error notification 184 to the RAID group object 195 informing the RAID group object 195 that the respective count associated with the device 44(1) has reached or exceeded the proactive copy threshold. In response to the error notification 184 from the error notification object 183, the RAID group object 195 sends health check commands 182(2), . . . , 182(N+1) to other storage device objects 196(2), . . . , 196(N+1) that represent other storage devices 44(2), . . . , 44(N+1) of the RAID group 42. If the RAID group object 195 determines that each of these other storage devices 44 are healthy the RAID group object 195 will instruct 190 the storage device object 196(1) to take the storage device 44(1) offline. Subsequently, the control circuitry 40 can reconstruct the data associated with the storage device using the other storage device objects 196(2), . . . , 196(N+1) and store the reconstructed data on a spare storage device.

Regarding checking the health of the other storage devices, it should be understood that in some arrangements the health check commands 182 direct the other storage device objects 196(2), . . . , 196(N+1) to check their respective media error counts to ascertain a level of errors in connection with the corresponding storage devices 44(2), . . . , 44(N+1). For example, the amount of media errors may be compared to a health threshold that represents a fraction of the proactive copy threshold to determine the level of errors. In another arrangement, these commands 182 may direct the storage device objects 196 to retrieve information that contains an opinion that may be based on the type of storage device. For example, it will be appreciated that certain types may be more susceptible to media errors and the storage device objects 196 may possess or have access to such information.

Also, upon determining to take the failing storage device 44(1) offline, it should be further understood that the RAID group object 195 may direct the other storage device objects 196(2), . . . , 196(N+1) to no longer take their respective storage devices 44(2), . . . , 44(N+1) offline by incrementing or disabling the offline threshold associated with the other storage device objects 196(2), . . . , 196(N+1). This should help to increase the resiliency of the RAID group 42 by ensuring that other members of the RAID group are not taken offline during reconstruction as a result of media errors.

It should be understood that the first, second and third error situations of FIGS. 3, 4 and 5 were provided above by way of example only. Other scenarios exist as well. Additionally, other types of objects and other arrangements for the object hierarchies 100, 150 and 155 are suitable for use. Further details will now be provided with reference to FIG. 6.

Figure 6:
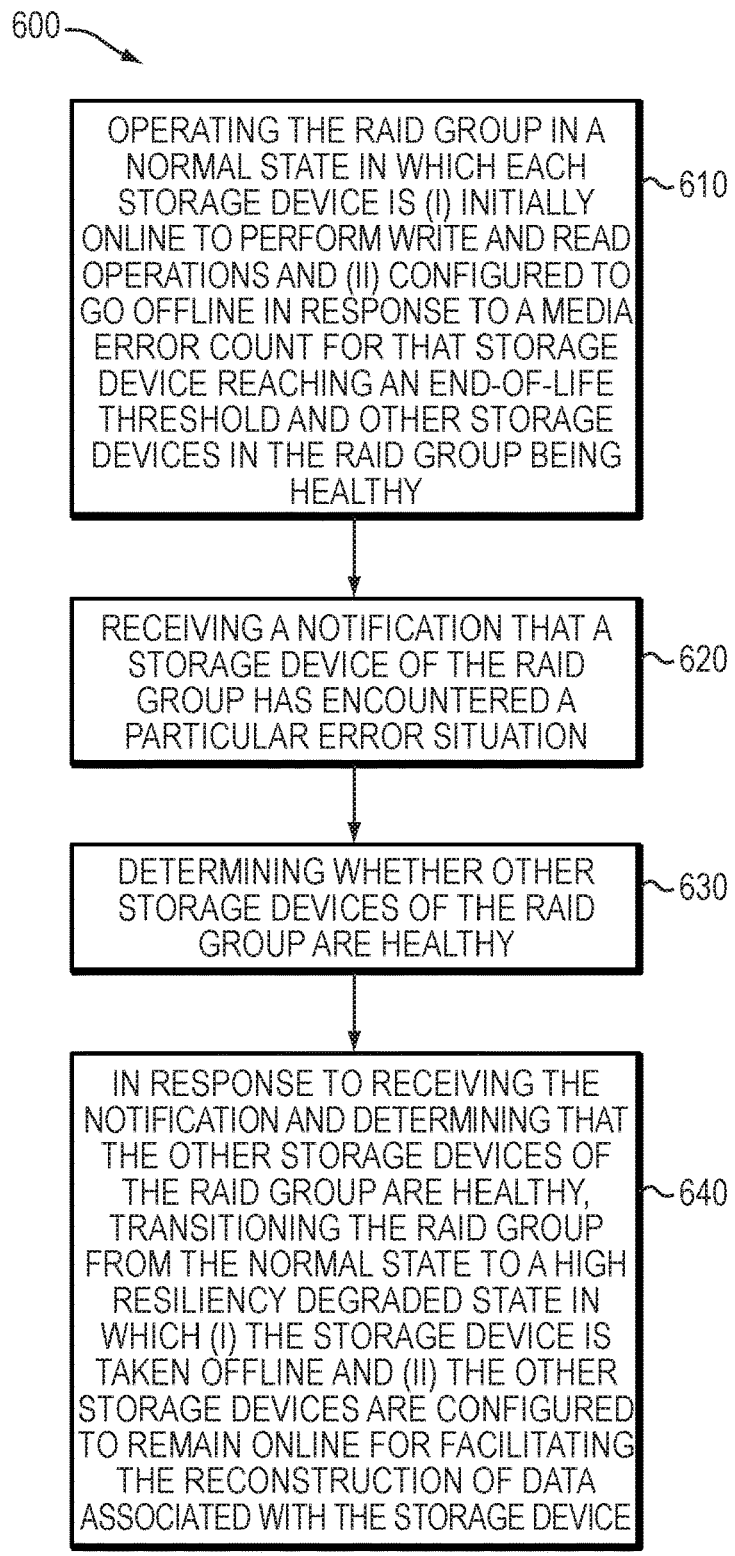
FIG. 6 is a flowchart of a procedure which is performed by the data storage equipment of FIG. 2.

FIG. 6 is a flowchart of a procedure 600 which is performed by the control circuitry 40 of the data storage equipment 24 (FIG. 2) to provide resiliency to a RAID group 42 which includes a plurality of storage devices 44.

At 610, the control circuitry 40 operates the RAID group in a normal state in which each storage device is (i) initially online to perform write and read operations and (ii) configured to go offline in response to a media error count for that storage device reaching an end-of-life threshold and other storage devices in the RAID group being healthy. Recall, that such monitoring and handling of the RAID group 42 can be accomplished via an object hierarchy (also see FIG. 5). It should also be understood from the above description that the end-of-life threshold corresponds in this embodiment to a proactive copy threshold associated with a proactive copy operation that involves proactively copying data to a spare storage device.

At 620, the control circuitry 40 receives a notification that a storage device of the RAID group has encountered a particular error situation. For example, a RAID group object can receive a notification that includes an alert indicating that the media error count for the storage device has reached the end-of-life threshold (FIG. 5).

At 630, the control circuitry 40 determines whether other storage devices of the RAID group are healthy. As described above with respect to FIG. 5, the RAID group object can dispatch health check commands to remaining or other storage device objects of the RAID group to facilitate determining the health of the other storage devices. It should be understood that in some arrangements the health of each of the other storage devices of the RAID group can be determined based on respective media error counts in connection with each of the other storage devices. It should be understood that in some arrangements the health of each of the other storage devices of the RAID group can be determined based on respective device types in connection with each of the other storage devices. It should be understood that in further arrangements the health of each of the other storage devices of the RAID group can be determined based on respective opinions formed by a person(s) in connection with each of the other storage devices.

At 640, the control circuitry 40 transitions, in response to receiving the notification and determining that the other storage devices of the RAID group are healthy, the RAID group from the normal state to a high resiliency degraded state in which (i) the storage device is taken offline and (ii) the other storage devices are configured to remain online for facilitating the reconstruction of data associated with the storage device. For example, the RAID group object can dispatch health check commands to raise or disable initial media error thresholds and thus make the operable storage devices 44 of the RAID group 42 more resilient to failure.

Additionally, it should be understood that the procedure 600 comprises further steps not described above with respect to FIG. 6. In particular, it should be appreciated that the procedure 600 may also comprise the steps of reconstructing data in connection with the storage device from the other storage devices of the RAID group and storing that reconstructed data on a spare storage device.

Advantageously, by failing the failing storage device rather than performing the proactive copy operation, the probability of a host timeout can be reduced. If the situation with respect to the failing storage device is severe enough the option of reconstruction can be the quicker option due to the fact that a media error at storage device level can take up to several seconds to be reported while reconstruction can be done on the order of milliseconds. Also, the probability of a data loss can also be reduced when all the remaining storage devices are in highly reliable and healthy state.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the data storage environment 20 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

Additionally, it should be understood that in some embodiments when a RAID group 42 enters the high resiliency degraded state, the control circuitry 40 can disable some thresholds and modify other thresholds. For example, the control circuitry 40 can disable use of take-offline threshold (e.g., to add resiliency to the RAID group 42) and modify the proactive copy threshold (e.g., to resist starting another proactive copy process that could further strain the RAID group 42), etc.

Furthermore, it should be understood that RAID Level 5 with N+1 storage devices was used in connection with the scenarios of FIGS. 3, 4 and 5 by way of example only. The above-described resiliency improvements can be utilized with other RAID levels as well (e.g., RAID Level 4, RAID Level 6, etc.). Furthermore, such improvements can be used in connection with N+2 storage devices, N+3 storage devices, and so on. Such modifications and enhancements are intended to belong to various embodiments of the disclosure.

What is claimed is:

1. A computer-implemented method of providing resiliency to a redundant array of independent disk (RAID) group which includes a plurality of storage devices, the method comprising:
    operating the RAID group in a normal state in which each storage device is (i) initially online to perform write and read operations and (ii) configured to go offline in response to a respective media error count for that storage device reaching an initial take-offline threshold;
    receiving a notification of an impending end-of-life state in connection with a storage device of the RAID group;
    in response to receiving the notification, determining the health of one or more other storage devices of the RAID group; and
    upon determining that the one or more other storage devices are in a healthy state, transitioning the RAID group from the normal state to a high resiliency degraded state in which the storage device is offline and each of the one or more other storage devices are still online to perform write and read operations and configured to stay online even when the respective media error count for that storage device reaches the initial take-offline threshold;
    wherein receiving the notification includes electronically detecting that a first storage device of the RAID group comprises a media error count indicative of an impending end-of-life state; and
    wherein transitioning includes electronically preventing a second storage device of the RAID group from going offline in response to the media error count for the second storage device reaching the initial take-offline threshold, the RAID group thereby made to operate in the high resiliency degraded state in which the second storage device remains online performing write and read operations even though the media error count of the second storage device has reached the initial take-offline threshold.

2. The method as claimed in claim 1, wherein receiving the notification, comprises:
    receiving, as the notification, an alert indicating that the media error count for the first storage device has reached an end-of-life threshold.

3. The method as claimed in claim 1, wherein determining the health of one or more other storage devices of the RAID group, comprises:
    determining the health of each of the other storage devices of the RAID group based on respective media error counts in connection with each of the other storage devices.

4. The method as claimed in claim 1, wherein determining the health of one or more other storage devices of the RAID group, comprises:
    determining the health of each of the other storage devices of the RAID group based on respective device types in connection with each of the other storage devices.

5. The method as claimed in claim 1, wherein determining the health of one or more other storage devices of the RAID group, comprises:
    determining the health of each of the other storage devices of the RAID group based on respective opinions formed by at least one person in connection with each of the other storage devices.

6. The method as claimed in claim 1, further comprising:
    reconstructing data in connection with the storage device from the other storage devices of the RAID group, and storing that reconstructed data on a spare storage device.

7. The method as claimed in claim 1, wherein the end-of-life state is defined by a proactive copy threshold.

8. A computer program product having a non-transitory computer readable medium which stores a set of instructions to provide resiliency to a redundant array of independent disk (RAID) group which includes a plurality of storage devices, the set of instructions, when carried out by computerized circuitry, causing the computerized circuitry to perform a method of:
    operating the RAID group in a normal state in which each storage device is (i) initially online to perform write and read operations and (ii) configured to go offline in response to a respective media error count for that storage device reaching an initial take-offline threshold;
    receiving a notification of an impending end-of-life state in connection with a storage device of the RAID group;
    in response to receiving the notification, determining the health of one or more other storage devices of the RAID group; and
    upon determining that the one or more other storage devices are in a healthy state, transitioning the RAID group from the normal state to a high resiliency degraded state in which the storage device is offline and each of the one or more other storage devices are still online to perform write and read operations and configured to stay online even when the respective media error count for that storage device reaches the initial take-offline threshold;
    wherein receiving the notification includes electronically detecting that a first storage device of the RAID group comprises a media error count indicative of an impending end-of-life state; and
    wherein transitioning includes electronically preventing a second storage device of the RAID group from going offline in response to the media error count for the second storage device reaching the initial take-offline threshold, the RAID group thereby made to operate in the high resiliency degraded state in which the second storage device remains online performing write and read operations even though the media error count of the second storage device has reached the initial take-offline threshold.

9. The computer program product as claimed in claim 8, wherein receiving the notification, comprises:
receiving, as the notification, an alert indicating that the media error count for the first storage device has reached an end-of-life threshold.

10. The computer program product as claimed in claim 8, wherein determining the health of one or more other storage devices of the RAID group, comprises:
determining the health of each of the other storage devices of the RAID group based on respective media error counts in connection with each of the other storage devices.

11. The computer program product as claimed in claim 8, wherein determining the health of one or more other storage devices of the RAID group, comprises:
determining the health of each of the other storage devices of the RAID group based on respective device types in connection with each of the other storage devices.

12. The computer program product as claimed in claim 8, wherein determining the health of one or more other storage devices of the RAID group, comprises:
determining the health of each of the other storage devices of the RAID group based on respective opinions formed by at least one person in connection with each of the other storage devices.

13. The computer program product as claimed in claim 8, further comprising:
reconstructing data in connection with the storage device from the other storage devices of the RAID group, and storing that reconstructed data on a spare storage device.

14. The computer program product as claimed in claim 8, wherein the end-of-life state is defined by a proactive copy threshold.

15. Data storage equipment, comprising:
a set of host interfaces to interface with a set of host computers;
a redundant array of independent disk (RAID) group which includes a plurality of storage devices to store host data on behalf of the set of host computers; and
control circuitry coupled to the set of host interfaces and the RAID group, the control circuitry being constructed and arranged to:
operate the RAID group in a normal state in which each storage device is (i) initially online to perform write and read operations and (ii) configured to go offline in response to a respective media error count for that storage device reaching an initial take-offline threshold;
receive a notification of an impending end-of-life state in connection with a storage device of the RAID group;
in response to receiving the notification, determine the health of one or more other storage devices of the RAID group; and
upon determining that the one or more other storage devices are in a healthy state, transition the RAID group from the normal state to a high resiliency degraded state in which the storage device is offline and each of the one or more other storage devices are still online to perform write and read operations and configured to stay online even when the respective media error count for that storage device reaches the initial take-offline threshold;
wherein receiving the notification includes electronically detecting that a first storage device of the RAID group comprises a media error count indicative of an impending end-of-life state; and
wherein transitioning includes electronically preventing a second storage device of the RAID group from going offline in response to the media error count for the second storage device reaching the initial take-offline threshold, the RAID group thereby made to operate in the high resiliency degraded state in which the second storage device remains online performing write and read operations even though the media error count of the second storage device has reached the initial take-offline threshold.

16. The data storage equipment as claimed in claim 15, wherein receiving the notification, comprises:
receiving, as the notification, an alert indicating that the media error count for the first storage device has reached an end-of-life threshold.

17. The data storage equipment as claimed in claim 15, wherein determining the health of one or more other storage devices of the RAID group, comprises:
determining the health of each of the other storage devices of the RAID group based on respective media error counts in connection with each of the other storage devices.

18. The data storage equipment as claimed in claim 15, wherein determining the health of one or more other storage devices of the RAID group, comprises:
determining the health of each of the other storage devices of the RAID group based on respective device types in connection with each of the other storage devices.

19. The data storage equipment as claimed in claim 15, wherein determining the health of one or more other storage devices of the RAID group, comprises:
determining the health of each of the other storage devices of the RAID group based on respective opinions formed by at least one person in connection with each of the other storage devices.

20. The data storage equipment as claimed in claim 15, further comprising:
reconstructing data in connection with the storage device from the other storage devices of the RAID group, and storing that reconstructed data on a spare storage device.

\* \* \* \* \*